US012797797B2

(12) United States Patent
Kim et al.

(10) Patent No.: US 12,797,797 B2
(45) Date of Patent: Nov. 17, 2026

(54) METHOD AND APPARATUS FOR TREATING WASTEWATER

(71) Applicant: Samsung Electronics Co., Ltd., Suwon-si (KR)

(72) Inventors: Daeok Kim, Suwon-si (KR); Dongyeun Koh, Daejeon (KR); David Kim, Suwon-si (KR); Jeong-Un Jang, Daejeon (KR)

(73) Assignees: SAMSUNG ELECTRONICS CO., LTD.; KOREA ADVANCED INSTITUTE OF SCIENCE AND TECHNOLOGY, Daehak-ro (KR)

( * ) Notice: Subject to any disclaimer, the term of this patent is extended or adjusted under 35 U.S.C. 154(b) by 532 days.

(21) Appl. No.: 18/374,378

(22) Filed: Sep. 28, 2023

(65) Prior Publication Data

US 2024/0173671 A1 May 30, 2024

(30) Foreign Application Priority Data

Nov. 30, 2022 (KR) ........................ 10-2022-0165110

(51) Int. Cl.
*B01D 61/36* (2006.01)
*B01D 69/02* (2006.01)
(Continued)

(52) U.S. Cl.
CPC ........... *B01D 61/362* (2013.01); *B01D 69/02* (2013.01); *B01D 69/04* (2013.01); *C01F 5/28* (2013.01);
(Continued)

(58) Field of Classification Search
CPC ............ B01D 19/0005; B01D 19/0031; B01D 61/362; B01D 69/02; B01D 69/04;
(Continued)

(56) References Cited

U.S. PATENT DOCUMENTS

| | | | |
|---|---|---|---|
| 5,980,850 | A | 11/1999 | Lebl |
| 7,396,458 | B2 | 7/2008 | Umezawa et al. |

(Continued)

FOREIGN PATENT DOCUMENTS

| | | | |
|---|---|---|---|
| JP | 6797632 | B2 * | 12/2020 |
| KR | 100805866 | B1 | 2/2008 |

(Continued)

OTHER PUBLICATIONS

"Composite membranes prepared by concentrated emulsion polymerization and their use for pervaporation separation of water-acetic acid mixtures," J. of Membrane Sci., 66:205-210 (Year: 1992).*

(Continued)

*Primary Examiner* — Patrick Orme
(74) *Attorney, Agent, or Firm* — Muir Patent Law, PLLC

(57) ABSTRACT

A method for treating wastewater containing fluorine is disclosed. The method for treating wastewater includes applying a vacuum to a membrane unit including a membrane having a hollow, injecting wastewater into the membrane unit so that the wastewater contacts an outer surface of the membrane, recovering hydrofluoric acid gas by evaporating hydrofluoric acid (HF) in the wastewater based on a vacuum applied to the inner surface of the membrane and moving the evaporated hydrofluoric acid (HF) to the inner surface through the membrane, injecting sweep gas into the membrane unit to discharge hydrofluoric acid gas remaining on the inner surface of the membrane, and forming a metal fluoride by reacting the recovered hydrofluoric acid gas with a metal oxide or metal hydroxide using a scrubbing process.

20 Claims, 11 Drawing Sheets

(51) Int. Cl.

| | |
|---|---|
| ***B01D 69/04*** | (2006.01) |
| ***C01F 5/28*** | (2006.01) |
| ***C01F 7/50*** | (2006.01) |
| ***C01F 11/22*** | (2006.01) |
| ***C02F 1/44*** | (2023.01) |
| ***C02F 1/66*** | (2023.01) |
| ***C02F 101/14*** | (2006.01) |
| *C02F 103/34* | (2006.01) |

(52) U.S. Cl.
CPC ................ *C01F 7/50* (2013.01); *C01F 11/22* (2013.01); *C02F 1/448* (2013.01); *C02F 1/66* (2013.01); *B01D 2311/04* (2013.01); *B01D 2311/06* (2013.01); *B01D 2313/243* (2013.01); *B01D 2317/02* (2013.01); *B01D 2317/04* (2013.01); *B01D 2325/38* (2013.01); *C02F 2101/14* (2013.01); *C02F 2103/346* (2013.01); *C02F 2301/063* (2013.01); *C02F 2301/08* (2013.01)

(58) Field of Classification Search
CPC ........ B01D 2257/2047; B01D 2311/04; B01D 2311/06; B01D 2313/243; B01D 2317/02; B01D 2317/04; B01D 2325/38; B01D 2251/40; B01D 2311/13; B01D 2311/2673; C02F 1/448; C02F 1/583; C02F 1/66; C02F 2101/14; C02F 2103/346; C02F 2301/063; C02F 2301/08; C01F 5/28; C01F 7/50; C01F 11/22
See application file for complete search history.

(56) References Cited

U.S. PATENT DOCUMENTS

| | | | |
|---|---|---|---|
| 9,725,384 | B2 | 8/2017 | Elsheikh et al. |
| 11,235,284 | B2 | 2/2022 | Prince |
| 11,286,189 | B2 | 3/2022 | Rychen et al. |
| 2004/0104107 | A1 | 6/2004 | Mizutani et al. |

FOREIGN PATENT DOCUMENTS

| | | | | |
|---|---|---|---|---|
| KR | 101007522 | B1 | 1/2011 | |
| KR | 1020110075382 | A | 7/2011 | |
| KR | 101065940 | B1 | 9/2011 | |
| KR | 101982701 | B1 | 5/2019 | |
| KR | 102055054 | B1 | 1/2020 | |
| KR | 102325120 | B1 | 11/2021 | |
| WO | WO-2019083459 | A1 * | 5/2019 | .............. C02F 1/444 |

OTHER PUBLICATIONS

JP6797632B2—EPO Machine Translation (Year: 2026).*

* cited by examiner

FIG. 11

| No. | Solution Volume (mL) | Feed flow rate (mL/min) | Sweep gas | pH | VACUUM DEGREE (Torr) | Circulation Time (hr) | CONCENTRATION BEFORE TREATMENT [F−] ppm | CONCENTRATION AFTER TREATMENT [F−] ppm | REMOVAL RATE (%) | AREA OF MEMBRANE |
|---|---|---|---|---|---|---|---|---|---|---|
| 1 | 50 | 5 | N2 (200mL/min) | 2.0 – 2.1 | 0.886 | 20 | 1050 | 540 | 49 | MICRO-SIZED MODULE |
| 2 | 50 | 0.5 | – | 2.0 – 2.1 | 0.436 | 20 | 1050 | 500 | 52 | MICRO-SIZED MODULE |
| 3 | 100 | 0.5 | – | 2.0 – 2.1 | 8.7 | 20 | 1050 | 525 | 50 | MEDIUM-SIZED MODULE |
| 4 | 100 | 5 | – | 2.0 – 2.1 | 13.57 | 20 | 1050 | 670 | 36 | MEDIUM-SIZED MODULE |
| 5 | 100 | 0.5 | – | 2.0 – 2.1 | 5.06 | 20 | 1050 | 642 | 39 | MEDIUM-SIZED MODULE |
| 6 | 50 | 0.5 | – | 2.0 – 2.1 | 0.436 | 20 | 1050 | 500 | 52 | MICRO-SIZED MODULE |
| 7 | 100 | 0.5 | – | 2.0 – 2.1 | 8.7 | 20 | 1050 | 525 | 50 | MEDIUM-SIZED MODULE |
| 8 | 100 | 5 | – | 2.0 – 2.1 | 13.57 | 20 | 1050 | 670 | 36 | MEDIUM-SIZED MODULE |
| 9 | 100 | 0.5 | – | 2.0 – 2.1 | 5.06 | 20 | 1050 | 642 | 39 | MEDIUM-SIZED MODULE |

METHOD AND APPARATUS FOR TREATING WASTEWATER

CROSS-REFERENCE TO RELATED APPLICATION

This application is based on and claims priority under 35 U.S.C. § 119 to Korean Patent Application No. 10-2022-0165110, filed on Nov. 30, 2022, in the Korean Intellectual Property Office, the disclosure of which is incorporated by reference herein in its entirety.

BACKGROUND

The inventive concept relates to a method and apparatus for treating wastewater, and more particularly, to a method and apparatus for treating wastewater containing fluorine.

As industries are advancing and becoming more diversified, various pollutants are emitted from industrial facilities. For example, wastewater containing hydrogen fluoride used in a semiconductor manufacturing process causes corrosion of treatment equipment, ecotoxicity, or environmental pollution, and thus it is required to treat and recycle the wastewater in an environmentally friendly manner.

SUMMARY

The inventive concept provides a method and apparatus for treating wastewater containing fluorine in an environmentally friendly manner and for recycling the wastewater.

According to an aspect of the inventive concept, there is provided a method for treating wastewater containing fluorine including applying a vacuum to a membrane unit including a membrane having a hollow, injecting wastewater into the membrane unit so that the wastewater contacts an outer surface of the membrane, recovering hydrofluoric acid gas by evaporating hydrofluoric acid (HF) in the wastewater based on a vacuum applied to the inner surface of the membrane and moving the evaporated hydrofluoric acid (HF) to the inner surface through the membrane, injecting sweep gas into the membrane unit to discharge hydrofluoric acid gas remaining on the inner surface of the membrane; and forming a metal fluoride by reacting the recovered hydrofluoric acid gas with a metal oxide or metal hydroxide using a scrubbing process.

According to another aspect of the inventive concept, there is provided an apparatus for treating wastewater containing fluorine including a water storage tank in which wastewater is stored, a membrane unit including a membrane having a hollow and installed so that the wastewater supplied from the water storage tank being in contact with an outer surface of the membrane, a pump connected to the membrane unit and configured to apply a vacuum to an inner surface of the membrane such that hydrofluoric acid (HF) gas from the wastewater disposed within the membrane unit moves through the membrane onto the inner surface of the membrane, and a scrubbing unit connected to the membrane unit and configured to react hydrofluoric acid gas recovered from the membrane unit with a metal oxide or a metal hydroxide to form a metal fluoride.

According to another aspect of the inventive concept, there is provided an apparatus for treating wastewater containing fluorine a water storage tank in which wastewater is stored, a membrane unit including a membrane having a hollow and installed so that the wastewater supplied from the water storage tank being in contact with an outer surface of the membrane, a pump connected to the membrane unit and configured to apply a vacuum to an inner surface of the membrane such that hydrofluoric acid (HF) gas from the wastewater disposed within the membrane unit moves through the membrane onto the inner surface of the membrane; a sweep gas supply unit connected to the membrane unit and configured to inject sweep gas through the inner surface of the membrane; and a scrubbing unit connected to the membrane unit and configured to react hydrofluoric acid gas recovered from the membrane unit with a metal oxide or metal hydroxide to form a metal fluoride.

BRIEF DESCRIPTION OF THE DRAWINGS

Embodiments of the inventive concept will be more clearly understood from the following detailed description taken in conjunction with the accompanying drawings in which:

FIG. 11 is a table showing experimental results obtained by using a method for treating wastewater according to embodiments.

DETAILED DESCRIPTION OF THE EMBODIMENTS

Hereinafter, examples of the technical idea of the present invention will be described in detail with reference to the accompanying drawings.

Figure 1:
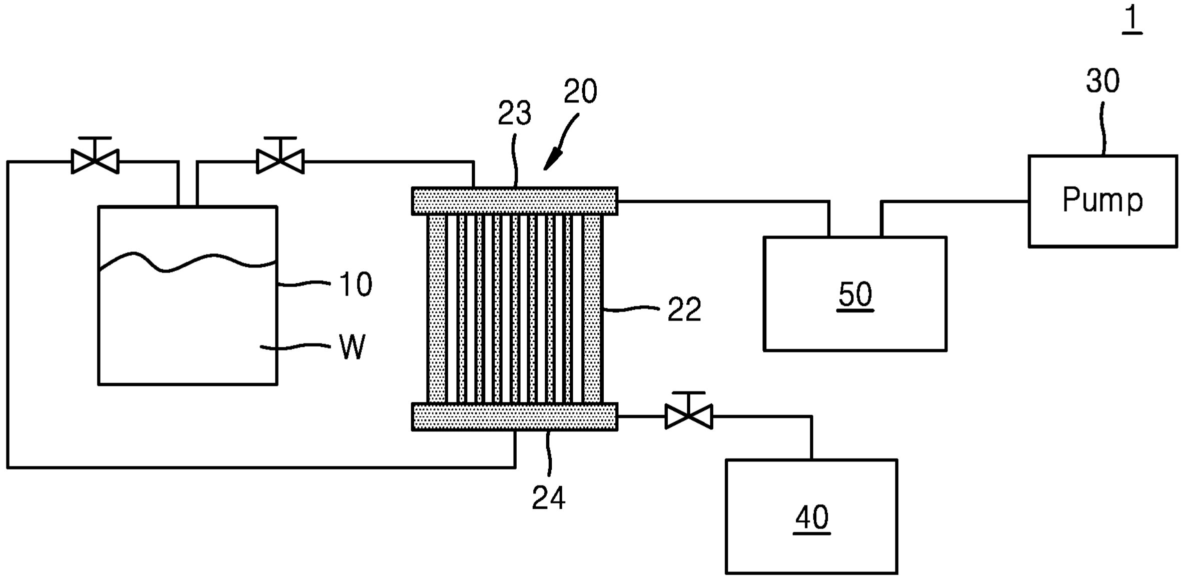
FIG. 1 is a diagram schematically illustrating an apparatus for treating wastewater according to embodiments.
Figure 2:
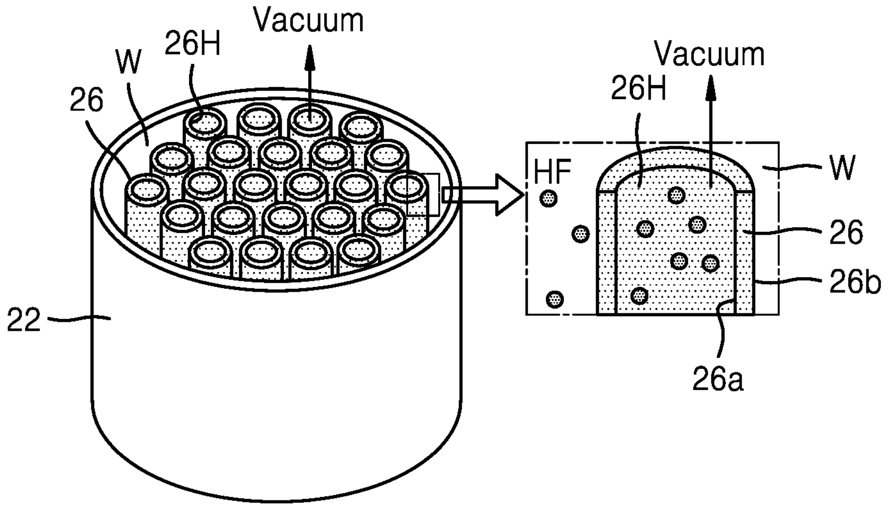
FIG. 2 is a schematic diagram showing a membrane unit of the apparatus for treating wastewater of FIG. 1.

FIG. 1 is a diagram schematically illustrating an apparatus for treating wastewater 1 according to embodiments. FIG. 2 is a schematic diagram showing a membrane unit 20 of the apparatus for treating wastewater 1 of FIG. 1.

Referring to FIGS. 1 and 2, the apparatus for treating wastewater 1 may include a water storage tank 10, a membrane unit 20, a pump 30, a sweep gas applying unit 40, and a scrubbing unit 50.

The water storage tank 10 may store wastewater W containing hydrofluoric acid. For example, the wastewater W may be generated from a diffusion process using fluorine, an etching process using fluorine, or a cleaning process using fluorine in a semiconductor manufacturing process. In embodiments, the wastewater W may contain fluorine ions at a concentration of 100 to 30,000 ppm. In some embodiments, the wastewater W may be an aqueous solution having a pH of 3 or less, and may include, for example, halogen ions, such as fluorine ions at a concentration of about 1000 ppm. In embodiments, a pH control unit may be further connected to the water tank 10 and the pH of the wastewater W may be adjusted by adding an acidic solution such as sulfuric acid or hydrochloric acid to the water storage tank 10.

The membrane unit 20 may be installed to be connected to the water storage tank 10 so that wastewater W may pass through the membrane unit 20. The membrane unit 20 may be configured to separate and recover an acidic contaminant such as a halogen containing acid, e.g. hydrofluoric acid from the wastewater W supplied from the water storage tank 10 and supply it to the scrubbing unit 50. In embodiments, a peristaltic pump may be connected between the water storage tank 10 and the membrane unit 20, and wastewater W may be supplied from the water storage tank 10 to the membrane unit 20.

The membrane unit 20 may include a housing 22 having an inlet end 23 and an outlet end 24 and a membrane 26 disposed within the housing 22. The membrane 26 may include a cavity, chamber or hollow e.g. finely sized hollow 26H, and may be configured such that a vacuum is applied or a sweep gas is supplied through the hollow 26H. A negative pressure can be applied to the hollow 26H where the negative pressure is less than atmospheric pressure and less than ambient pressure, such as less than 380 Torr, or less than 240 Torr, e.g. from about 0.1 to about 100 Torr.

In embodiments, the membrane 26 may include a material having acid resistance and hydrophobicity. In embodiments, the membrane 26 may include at least one of tetrafluoroethylene hexafluoropropylene (FEP), perfluoroalkylvinylether (PFA), ethylene-tetrafluoroethylene (ETFE), polyvinylidene fluoride (PVDF), polytetrafluoroethylene (PTFE), polyethylene (PE), polypropylene (PP), polyether ether ketone (PEEK), polyarylsulfone (PSU), polyethersulphone (PES), polyimide (PI), and polybenzimidazole (PBI).

A pump 30 may be connected to the membrane unit 20 and installed to apply a vacuum to the membrane unit 20. For example, the pump 30 may include a vacuum pump and may draw a vacuum such that a pressure of about 0.1 to about 100 Torr is maintained within the hollow 26H of the membrane 26. In embodiments, a scrubbing unit 50 may be disposed between the membrane unit 20 and the vacuum pump 30. However, in other embodiments, the vacuum pump 30 may be directly connected to the membrane unit 20 without a scrubbing unit 50 between the membrane unit 20 and the vacuum pump 30.

The membrane 26 may have an inner surface 26*a* and an outer surface 26*b*, and the wastewater W injected through a wastewater inlet disposed at the inlet end 23 of the housing 22 flows in contact with the outer surface 26*b* of the membrane 26 and may be discharged to the outside of the membrane unit 20 through a wastewater outlet disposed at the outlet end 24 of the housing 22. The wastewater W is passed through the membrane unit 20 and is discharged to the outside of the membrane unit 20, for example, and the wastewater W from which hydrofluoric acid gas (HF) has been separated or removed may be put into the water storage tank 10 again.

In embodiments, the gas outlet through which a vacuum may be applied from the pump 30 may be formed at the inlet end 23 of the housing 22, and a vacuum may be induced into the hollow 26H of the membrane 26 through the gas outlet. The membrane unit 20 may be configured such that only the outer surface of the membrane 26 is in contact with the wastewater W and the inner surface 26*a* of the membrane 26 is exposed by the hollow 26H and is prevented from direct contact with the wastewater W. As shown in FIG. 2, for example, a vacuum is induced inside the hollow 26H to maintain a reduced pressure atmosphere, so that hydrofluoric acid gas (HF) dissolved in the wastewater W may be evaporated and moved through the membrane 26 onto the inner surface 26*a* of the membrane 26. The hydrofluoric acid gas (HF) moved onto the inner surface 26*a* of the membrane 26 or into the hollow 26H may be discharged to the outside of the membrane unit 20 through the inlet end 23 of the housing 22 by applying a vacuum.

In embodiments, the sweep gas application unit 40 may be connected to the membrane unit 20. For example, the sweep gas supply unit 40 may be connected to the outlet end 24 of the housing 22. The sweep gas supply unit 40 may be configured to inject sweep gas, such as nitrogen or air, into membrane unit 20 through outlet end 24 of housing 22. In some embodiments a noble gas or other non-reactive or low reactive gas (e.g. carbon dioxide) could be used, or some combination of the above. The sweep gas may be injected into the hollow 26H of the membrane 26 at a predetermined flow rate, and may help the hydrofluoric acid gas (HF) or hydrofluoric acid particles remaining in the hollow interior, for example on the inner surface 26*a* of the membrane 26, to escape out of the membrane unit 20 through the inlet end 23 of the housing 22.

The scrubbing unit 50 may be connected to the membrane unit 20, for example to the inlet end 23 of the housing 22. For example, the hydrofluoric acid gas (HF) separated and recovered from the membrane unit 20 is introduced into the scrubbing unit 50, and a mineralization reaction of the hydrofluoric acid gas (HF) may occur in the scrubbing unit 50. The scrubbing unit 50 may be a space in which a wet scrubbing process or a dry scrubbing process is performed so that hydrofluoric acid gas (HF) reacts with a metal oxide or a metal hydroxide to form a metal fluoride. Compounds other than a metal oxide or metal hydroxide, that form a metal halide (e.g. metal fluoride) or form another metallic compound with low solubility in water, could also be used (e.g. in the wet or dry scrubbing examples discussed below) such as calcium gluconate, calcium carbonate, calcium sulfate, magnesium carbonate, magnesium sulfate, calcium chloride, etc.

In alternative examples to that of FIG. 2, the sweep gas and wastewater can flow in the same direction. Also, instead of the wastewater flowing on the outside of the hollows 26H, the wastewater can flow inside the hollows 26H and the vacuum or sweep gas provided in the remaining area surrounding the hollows 26H. Also the cylindrical shape of the hollows 26H in FIG. 2 is but one example, as other arrangements for separating the liquid and gas flows are possible (such as hollows having a rectangular or hexagonal cross section, a plurality of parallel surfaces forming alternating regions of liquid and gas, fin structures, concentric ring structures, honeycomb structures with alternating areas of liquid and gas, etc. can be utilized.

Figure 3:
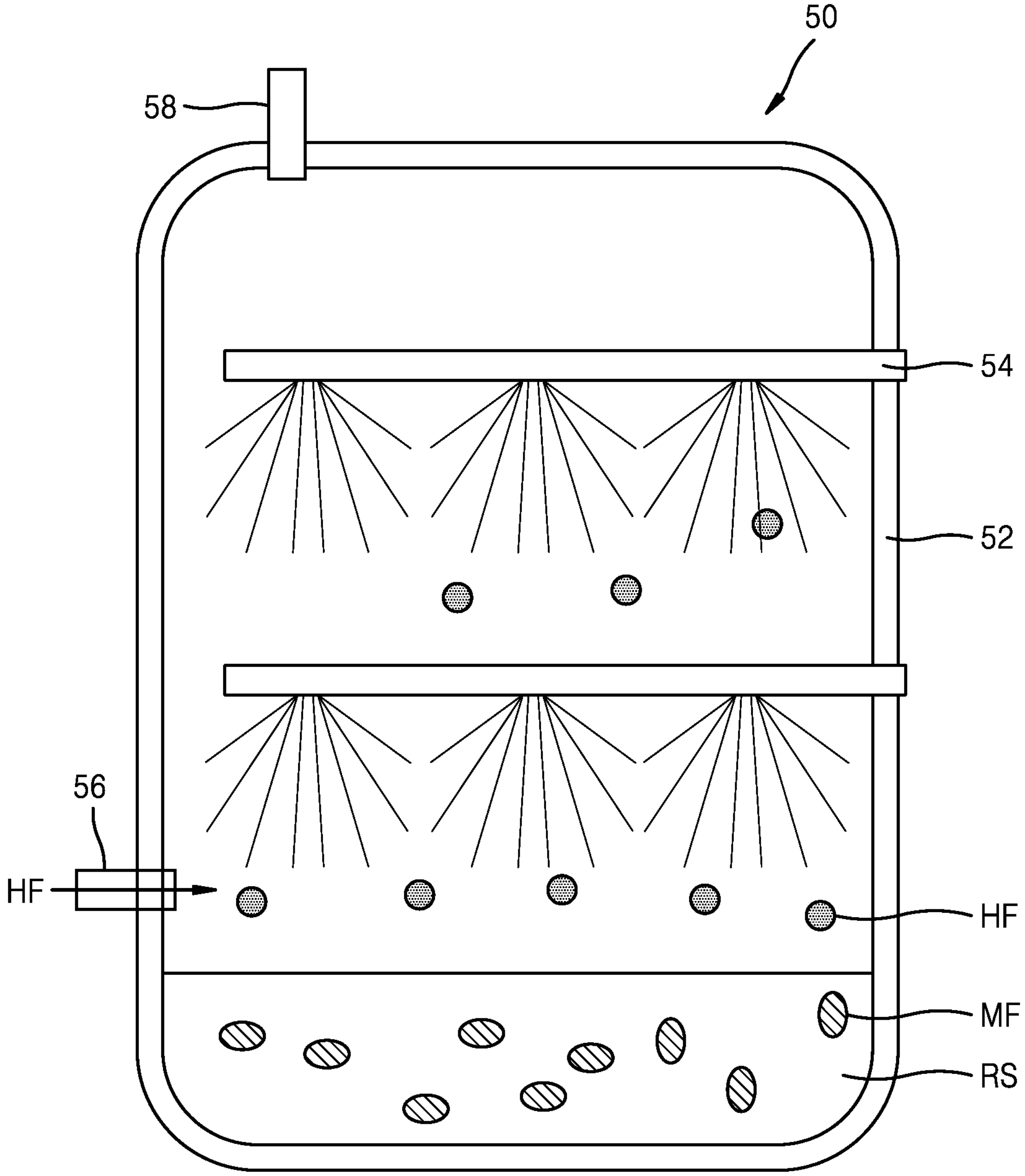
FIG. 3 is a schematic diagram illustrating an example of a scrubbing unit of FIG. 1.

FIG. 3 is a schematic diagram illustrating an example of a scrubbing unit 50 of FIG. 1. Referring to FIG. 3, the scrubbing unit 50 is a device in which a wet scrubbing process may be performed. The scrubbing unit 50 may include a scrubbing chamber 52, a liquid supply 54, a gas supply 56, and a gas outlet 58.

The scrubbing chamber 52 may be a reaction space in which the hydrofluoric acid gas (HF) separated and recovered from the membrane unit 20 is injected and a metal fluoride formation reaction may occur. The liquid supply unit 54 may be configured to inject an aqueous metal oxide solution or an aqueous metal hydroxide solution into the scrubbing chamber 52. For example, the liquid supply unit 54 may include a nozzle capable of spraying and injecting an aqueous oxide or hydroxide compound solution, such as an aqueous metal oxide or metal hydroxide solution, for example at least one of an aqueous calcium hydroxide solution, an aqueous calcium oxide solution, an aqueous aluminum hydroxide solution, an aluminum oxide aqueous solution, an aqueous solution of magnesium hydroxide, and a magnesium oxide aqueous solution into the internal space of the scrubbing chamber 52.

The gas supply unit 56 may be configured to inject hydrofluoric acid gas (HF) into the scrubbing chamber 52. The gas supply unit 56 may be connected to the inlet end 23 of the housing 22 of the membrane unit 20 so that hydrofluoric acid gas (HF) separated and recovered from the membrane unit 20 may be introduced into the internal space of the scrubbing chamber 52.

Metal fluoride precipitates MF may be formed by a chemical reaction between hydrofluoric acid gas (HF) and an aqueous metal oxide solution or an aqueous metal hydroxide solution in the scrubbing chamber 52. The metal fluoride precipitate (MF) formed by the reaction may be an insoluble precipitate and may remain in the form of sludge in the water (RS) formed by the chemical reaction.

For example, when a calcium hydroxide aqueous solution is supplied from the liquid supply unit 54, a reaction according to Formula 1 below may occur.

$$Ca(OH)_2+2HF\rightarrow 2H_2O+CaF_2— \quad \text{Formula 1}$$

For example, by the reaction of an aqueous calcium hydroxide solution with hydrofluoric acid gas, water and calcium fluoride may be generated. In this case, the calcium fluoride may have a purity of about 80% or more, preferably about 90% or more.

In embodiments, the scrubbing unit 50 may further include a drying device. When the metal oxide aqueous solution or the metal hydroxide aqueous solution reacts with hydrofluoric acid gas (HF) in the scrubbing chamber 52 to form the metal fluoride precipitate MF and water RS, the scrubbing unit 50 may be configured to evaporate the reaction product, water RS.

Water vapor or hydrofluoric acid gas remaining after the wet scrubbing process may be exhausted out of the scrubbing chamber 52 through the gas outlet 58. In embodiments, a cold trap may optionally be further installed between the gas outlet 58 of the scrubbing unit 50 and the pump 30 to condense water vapor discharged from the scrubbing unit 50.

Figure 4:
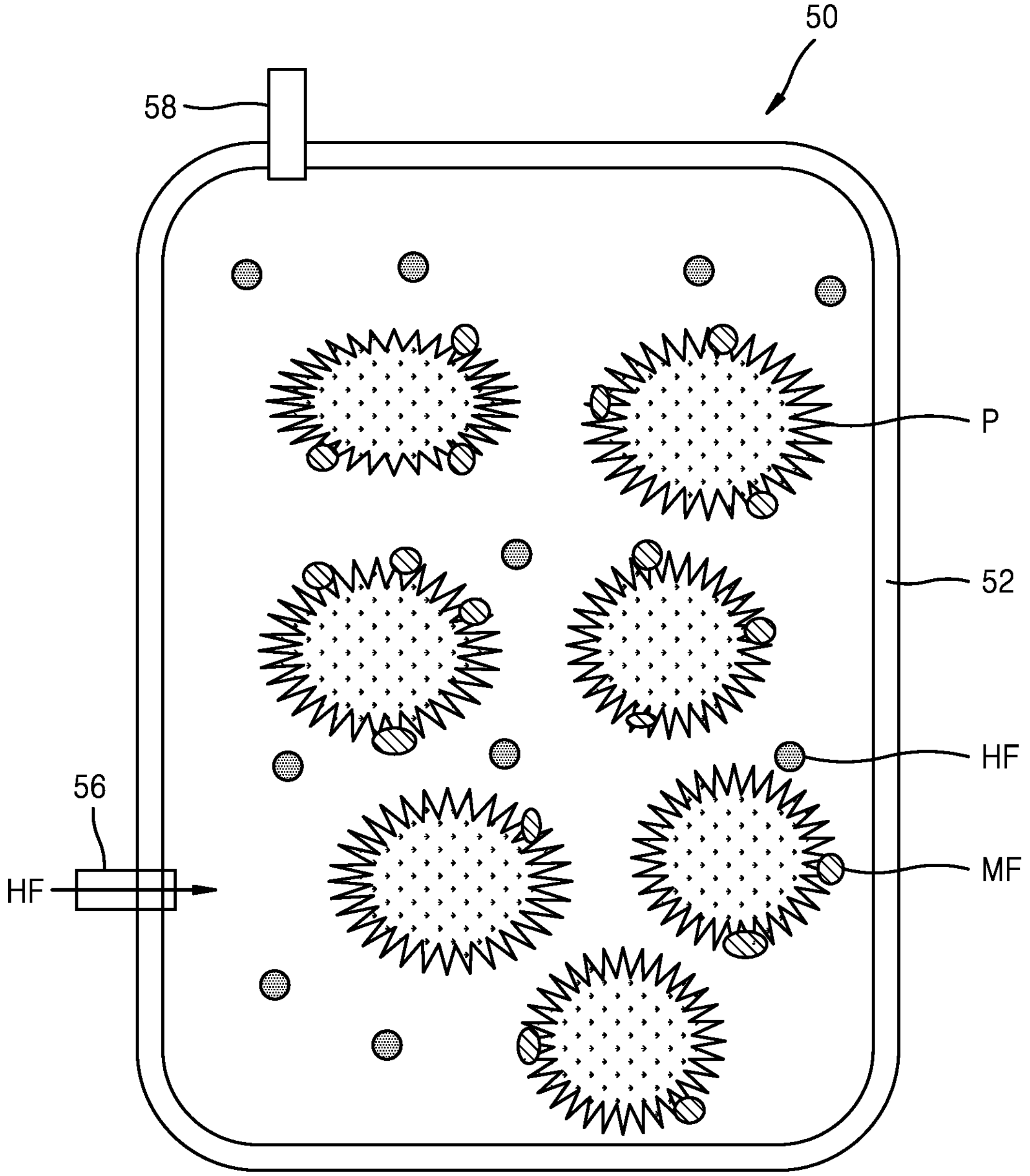
FIG. 4 is a schematic diagram illustrating an example of the scrubbing unit of FIG. 1.

FIG. 4 is a schematic diagram illustrating an example of the scrubbing unit 50 of FIG. 1.

Referring to FIG. 4, a scrubbing unit 50 is a device in which a dry scrubbing process may be performed. The scrubbing unit 50 may include a scrubbing chamber 52, a gas supply unit 56, and a gas outlet 58.

The scrubbing chamber 52 may be a reaction space in which the hydrofluoric acid gas (HF) separated and recovered from the membrane unit 20 is injected and a metal fluoride formation reaction may occur. Metal hydroxide pellets P may be accommodated in the scrubbing chamber 52. The metal hydroxide pellets P may include, for example, calcium hydroxide, aluminum hydroxide, or magnesium hydroxide. In embodiments, the metal hydroxide pellets P may have a relatively rugged and roughened surface morphology to increase the reaction area.

The gas supply unit 56 may be configured to inject hydrofluoric acid gas (HF) into the scrubbing chamber 52. The gas supply unit 56 may be connected to an inlet end 23 of the housing 22 of the membrane unit 20 so that hydrofluoric acid gas (HF) separated and recovered from the membrane unit 20 may be introduced into the internal space of the scrubbing chamber 52.

Metal fluoride MF may be formed by a chemical reaction between hydrofluoric acid gas (HF) and metal hydroxide pellets P in the scrubbing chamber 52. The metal fluoride MF may be formed on the surface of the metal hydroxide pellet P by a chemical reaction, and may remain attached to the surface of the metal hydroxide pellet MF. For example, when calcium hydroxide pellets are supplied into the scrubbing chamber 52, a reaction according to Formula 1 below may occur.

$$Ca(OH)_2+2HF\rightarrow 2H_2O+CaF_2— \quad \text{Formula 1}$$

For example, water and calcium fluoride may be produced by the reaction of calcium hydroxide pellets with hydrofluoric acid gas. In this case, the calcium fluoride may have a purity of about 80% or more, preferably about 90% or more.

In embodiments, the scrubbing unit 50 may further include a cleaning device and a drying device, and the metal fluoride particles formed by the chemical reaction in the scrubbing chamber 52 may be obtained by washing the metal oxide particles attached to the surface of the metal hydroxide pellets with water and then drying the washed metal oxide particles.

Figure 5:
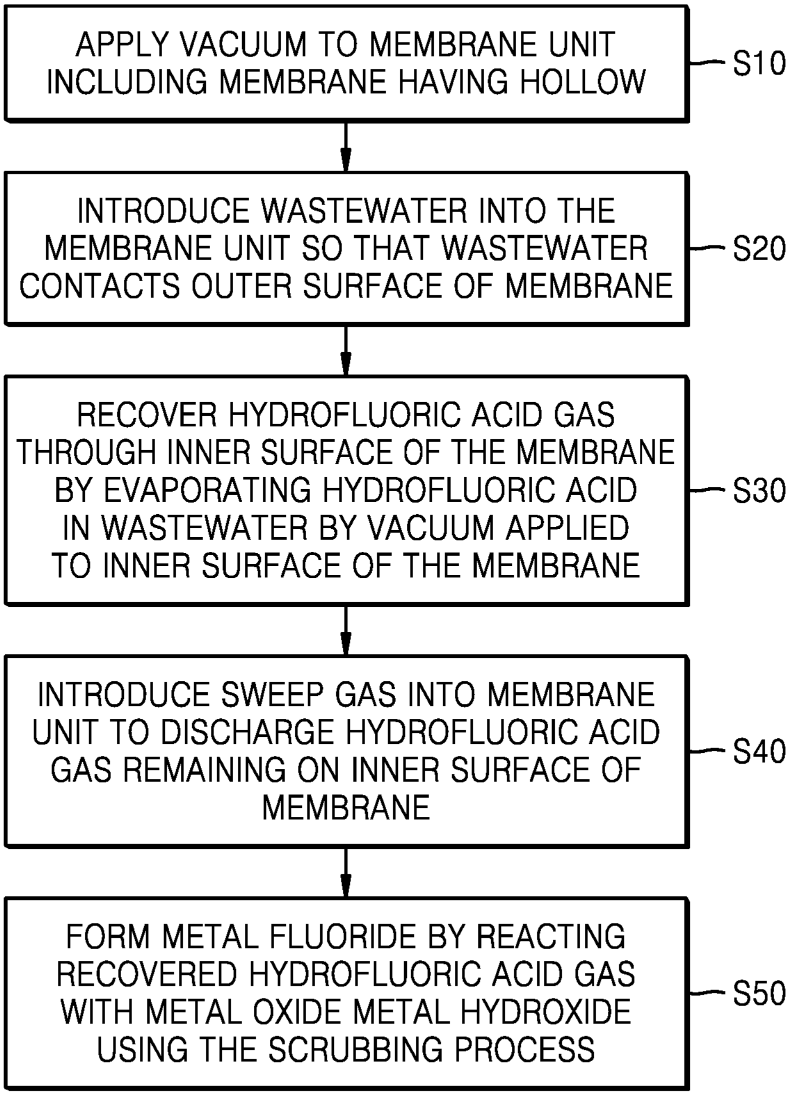
FIG. 5 is a flow chart illustrating a method for treating wastewater according to embodiments.
Figure 6:
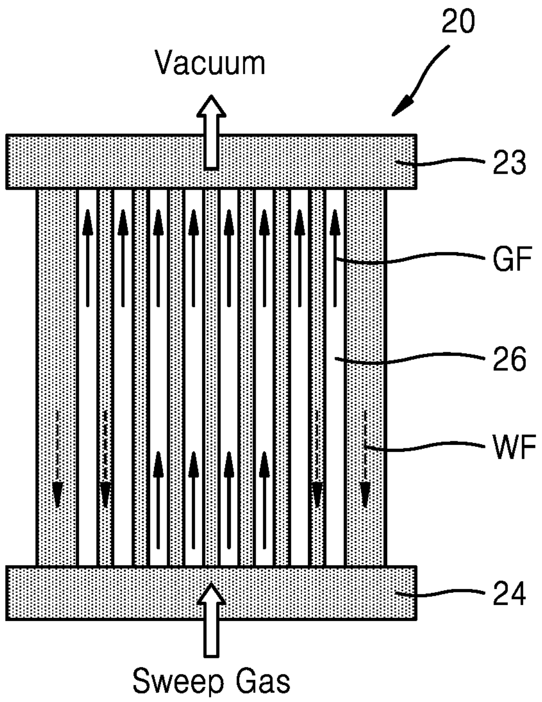
FIG. 6 is a schematic diagram showing fluid and gas flows within a membrane unit.
Figure 7:
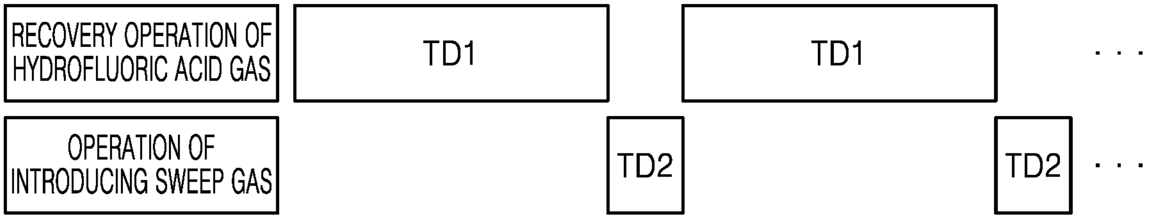
FIGS. 7 and 8 are timing diagrams showing parts of the method for treating wastewater of FIG. 5.
Figure 8:
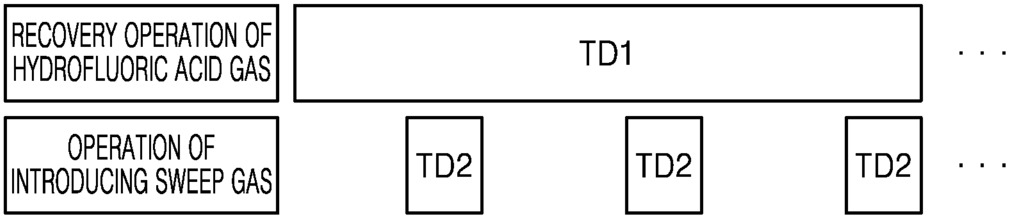

FIG. 5 is a flow chart illustrating a method for treating wastewater according to embodiments. FIG. 6 is a schematic diagram showing fluid and gas flows within a membrane unit 20. FIGS. 7 and 8 are timing diagrams showing portions of the method for treating wastewater.

Referring to FIG. 5, in operation S10, a vacuum may be applied to the membrane unit including a membrane having a hollow.

In embodiments, as described with reference to FIGS. 1 and 2, the membrane unit 20 may include a housing 22 having an inlet end 23 and an outlet end 24 and a membrane 26 disposed in the housing 22, and may be configured such that a vacuum is applied through the hollow 26H of the membrane 26. As indicated by the arrow GF in FIG. 6, air may flow in a direction from the outlet end 24 toward the inlet end 23, whereby a vacuum may be applied within the membrane 26 and a reduced pressure may be maintained.

In embodiments, a vacuum may be drawn from the pump 30 to maintain a pressure of about 0.1 to about 100 Torr in the membrane unit 20. In some embodiments, a vacuum may be drawn from the pump 30 to maintain a pressure of about 0.1 to about 5 Torr in the membrane unit 20.

Thereafter, in operation S20, the wastewater may be introduced into the membrane unit so that the wastewater contacts the outer surface of the membrane.

In embodiments, the wastewater W supplied from the water tank 10 may be introduced from the inlet end 23 of the housing 22 so that the wastewater W contacts the outer surface **26*b* of the membrane 26. For example, the wastewater W may be injected from the inlet end 23 of the housing 22 using a metering pump connected to the water storage tank 10**.

In embodiments, the input rate of the wastewater W may be 0.1 to 10 mL/min, and the volume of the wastewater W accommodated in the membrane unit 26 in one input operation may be 10 to 500 mL. Depending on the size of the membrane unit 26, the volume of the wastewater W injected in one injection operation may vary.

In embodiments, the wastewater W may include fluorine ions at a concentration of 100 to 30,000 ppm. In some embodiments, the wastewater W may be an aqueous solution having a pH of 3 or less, and may include, for example, fluorine ions at a concentration of about 1000 ppm. In embodiments, a pH control unit may be further connected to the water storage tank 10, and in this case, the pH of the wastewater W may be adjusted by adding an acidic solution such as sulfuric acid or hydrochloric acid to the water storage tank 10.

In some embodiments, as indicated by arrows WF in FIG. 6, wastewater W may flow. The waste water W may move from the inlet end 23 of the housing 22 toward the outlet end 24 to be in contact with the outer surface 26*b* of the membrane 26, and may not move through the membrane 26 from the outer side 26*b* to the inner side 26*a* of the membrane 26. A vacuum may be applied from the inlet formed at the inlet end 23 of the housing 22 through the hollow 26H of the membrane 26 to the inner space of the hollow 26H where the inner surface 26*a* of the membrane 26 is exposed. Accordingly, the space where the outer surface 26*b* of the membrane 26 is exposed and the space where the inner surface 26*a* of the membrane 26 is exposed may be separated from each other.

In embodiments, operation S10, which is an operation of applying a vacuum may be performed simultaneously with operation S20 which is an operation of introducing wastewater W. Alternatively, the operation S10 which is an operation of applying a vacuum may be performed after the operation S20 which is an operation of introducing wastewater W.

Thereafter, in operation S30, hydrofluoric acid gas may be recovered by evaporating hydrofluoric acid (HF) in the wastewater based on a vacuum applied to the inner surface of the membrane and moving the hydrofluoric acid (HF) to the inner surface through the membrane.

As shown in FIG. 2, for example, a vacuum is induced inside the hollow 26H to maintain a reduced pressure atmosphere, so that hydrofluoric acid gas (HF) dissolved in the wastewater W may be evaporated and moved through the membrane 26 onto the inner surface 26*a* of the membrane 26. The hydrofluoric acid gas (HF) moved onto the inner surface 26*a* of the membrane 26 or into the hollow 26H may be discharged to the outside of the membrane unit 20 through the inlet end 23 of the housing 22 by applying a vacuum.

In embodiments, operation S10, which is an operation of applying a vacuum, operation S20, which is an operation of introducing wastewater W, and operation S30, which is an operation of recovering hydrofluoric acid gas, may be performed simultaneously. For example, each of operations operation S10, which is an operation of applying a vacuum, operation S20, which is an operation of introducing wastewater W, and operation S30, which is an operation of recovering hydrofluoric acid gas, may be continuously performed during the first process time TD1. In some embodiments, the first process time TD1 may be 10 to 20 hours.

Thereafter, in operation S40, sweep gas may be introduced into the membrane unit to discharge hydrofluoric acid gas remaining on the inner surface of the membrane.

For example, using the sweep gas supply unit 40 connected to the outlet end 24 of the housing 22, a sweep gas such as nitrogen or air may be introduced into the membrane unit 20 through the outlet end 24 of the housing 22. As indicated by an arrow GF in FIG. 6, the sweep gas may flow in a direction from the outlet end 24 toward the inlet end 23. Accordingly, the sweep gas may be introduced into the hollow 26H of the membrane 26 at a predetermined flow rate from the outlet end 24 of the housing 22 toward the inlet end of the housing 22. For example, the sweep gas input flow rate may be between about 50 and 300 mL/min.

The input of sweep gas may assist in discharging the hydrofluoric acid gas (HF) or hydrofluoric acid particles remaining inside the hollow 26H or on the inner surface 26*a* of the membrane 26 to the outside of the membrane unit 20 through the inlet end 23 of the housing 22.

In embodiments, the introducing of the sweep gas may be performed during the second process time TD2. For example, the second process time (TD2) may have a range of about 1 second to about 10 minutes.

In embodiments, as shown in FIG. 7, after the hydrogen fluoride gas recovery operation S30 is performed during the first process time TD1, the sweep gas input operation may be performed during the second process time TD2. That is, operation S40, which is an operation of introducing the sweep gas, may be performed temporally separated from the operation S30 of recovering hydrofluoric acid gas.

In other embodiments, as shown in FIG. 8, operation S40, which is a sweep gas input operation, may be performed to temporally overlap with operation S30, which is an operation of recovering hydrofluoric acid gas. For example, during the first process time TD1, the hydrofluoric acid gas recovery operation S30 is performed, and during the hydrofluoric acid gas recovery operation, the sweep gas input operation S40 may be performed a plurality of times.

Referring back to FIG. 5, in operation S50, using the scrubbing process, a metal fluoride may be formed by reacting the recovered hydrofluoric acid gas with a metal oxide or metal hydroxide.

In embodiments, the hydrofluoric acid gas (HF) separated and recovered from the membrane unit 20 may be introduced into the scrubbing unit 50, and a mineralization reaction of the hydrofluoric acid gas (HF) may occur in the scrubbing unit 50.

In embodiments, operation S50, which is an operation of forming metal fluoride, may be performed using a wet scrubbing process. Operation S50, which is forming the metal fluoride, may be performed in the scrubbing unit 50 as shown in FIG. 3.

Metal fluoride precipitates MF may be formed by a chemical reaction between hydrofluoric acid gas (HF) and an aqueous metal oxide solution or an aqueous metal hydroxide solution in the scrubbing chamber 52. The metal fluoride precipitate MF formed by the reaction may be an insoluble precipitate and may remain in the form of sludge in the water RS formed by the chemical reaction.

For example, when the calcium hydroxide aqueous solution is supplied from the liquid supply unit 54, a reaction depending on Formula 1 below may occur.

$$Ca(OH)_2+2HF \rightarrow 2H_2O+CaF_2\text{—} \quad \text{Formula 1}$$

For example, when the aluminum hydroxide aqueous solution is supplied from the liquid supply unit 54, a reaction depending on Formula 2 below may occur.

$$Al(OH)_3+3HF \rightarrow 2H_2O+AlF_3\text{—} \quad \text{Formula 2}$$

For example, when the magnesium hydroxide aqueous solution is supplied from the liquid supply unit 54, a reaction according to Formula 3 below may occur.

$$Mg(OH)_2+2HF \rightarrow 2H_2O+MgF_2\text{—} \quad \text{Formula 3}$$

In embodiments, the metal fluoride precipitate MF and water RS may be formed by the reaction, and a metal fluoride precipitate MF may be obtained by evaporating water RS as a reaction product by a drying device.

In other embodiments, operation S50, which is an operation of forming metal fluoride, may be performed using a dry scrubbing process. Operation S50, which is an operation of forming metal fluoride, may be performed in the scrubbing unit 50 as shown in FIG. 4.

Metal hydroxide pellets P may be disposed in the scrubbing chamber 52, and the metal hydroxide pellets P may include, for example, calcium hydroxide or aluminum hydroxide. In embodiments, the metal hydroxide pellets P may have a relatively rugged and roughened surface morphology to increase the reaction area.

Metal fluoride MF may be formed by a chemical reaction between hydrofluoric acid gas (HF) and metal hydroxide pellets P in the scrubbing chamber 52. The metal fluoride MF may be formed on the surface of the metal hydroxide pellet by a chemical reaction, and may remain attached to the surface of the metal hydroxide pellet. For example, when calcium hydroxide pellets are supplied into the scrubbing chamber 52, a reaction according to Formula 1 below may occur.

$$Ca(OH)_2+2HF \rightarrow 2H_2O+CaF_2\text{—} \quad \text{Formula 1}$$

For example, when aluminum hydroxide pellets are supplied into the scrubbing chamber 52, a reaction depending on Formula 2 below may occur.

$$Al(OH)_3+3HF \rightarrow 2H_2O+AlF_3\text{—} \quad \text{Formula 2}$$

For example, when magnesium hydroxide pellets are supplied into the scrubbing chamber 52, a reaction depending on Formula 3 below may occur.

$$Mg(OH)_2+2HF \rightarrow 2H_2O+MgF_2\text{—} \quad \text{Formula 3}$$

In embodiments, the metal fluoride (MF) formed by a chemical reaction in the scrubbing chamber 52 may be attached to the surface of the metal hydroxide pellet P. Thereafter, the metal hydroxide pellets P may be washed with water and then dried to obtain metal fluoride (MF) particles.

In embodiments, operation S50, which is an operation of forming metal fluoride, may be performed simultaneously with operation S30, which is an operation of recovering hydrofluoric acid gas. For example, each of operation S50, which is an operation of forming metal fluoride, and operation S30, which is an operation of recovering hydrofluoric acid gas, may be continuously performed. Operation S50, which is an operation of forming metal fluoride, and operation S30, which is an operation of recovering hydrofluoric acid gas, may overlap in time. In other embodiments, operation S50, which is an operation of forming metal fluoride, may be performed after operation S30, which is an operation of recovering hydrofluoric acid gas. For example, operation S50, which is an operation of forming metal fluoride, may be temporally separated from operation S30, which is an operation of recovering hydrofluoric acid gas, and performed after operation S30, which is an operation of recovering hydrofluoric acid gas.

In general, wastewater containing fluorine is recovered in the form of metal fluoride sludge through a precipitation reaction with slaked lime in a reaction tank. However, a large amount of sludge is obtained because it is required to sequentially cause a precipitation reaction through a plurality of reaction tanks. In addition, because precipitates containing various impurities such as phosphoric acid and sulfuric acid in addition to fluorine are obtained, the purity of metal fluoride is relatively low, and recycling using these precipitates is limited.

However, according to embodiments, hydrofluoric acid gas may be separated using a membrane and a mineralization reaction of the hydrofluoric acid gas may be generated by a scrubbing process. Therefore, compared to the conventional precipitation method using slaked lime, the amount of contaminants produced may be reduced, enabling an environmentally friendly recovery process. In addition, high-purity metal fluoride may be obtained by this method, and thus recycling of the metal fluoride may be facilitated. Taking calcium fluoride as one example, CaF2 can be used for dental products such as toothpaste and mouthwash, aluminum manufacturing, glass making, fabrication of lenses and prisms, enamels, kitchen utensils, etc. Magnesium fluoride and aluminum fluoride can be used for protective and optical coatings. Thus, rather than removing HF from wastewater in a disposable sludge, forming usable fluoride compounds helps to recycle some of the fluorine/HF used in semiconductor device manufacturing.

Figure 9:
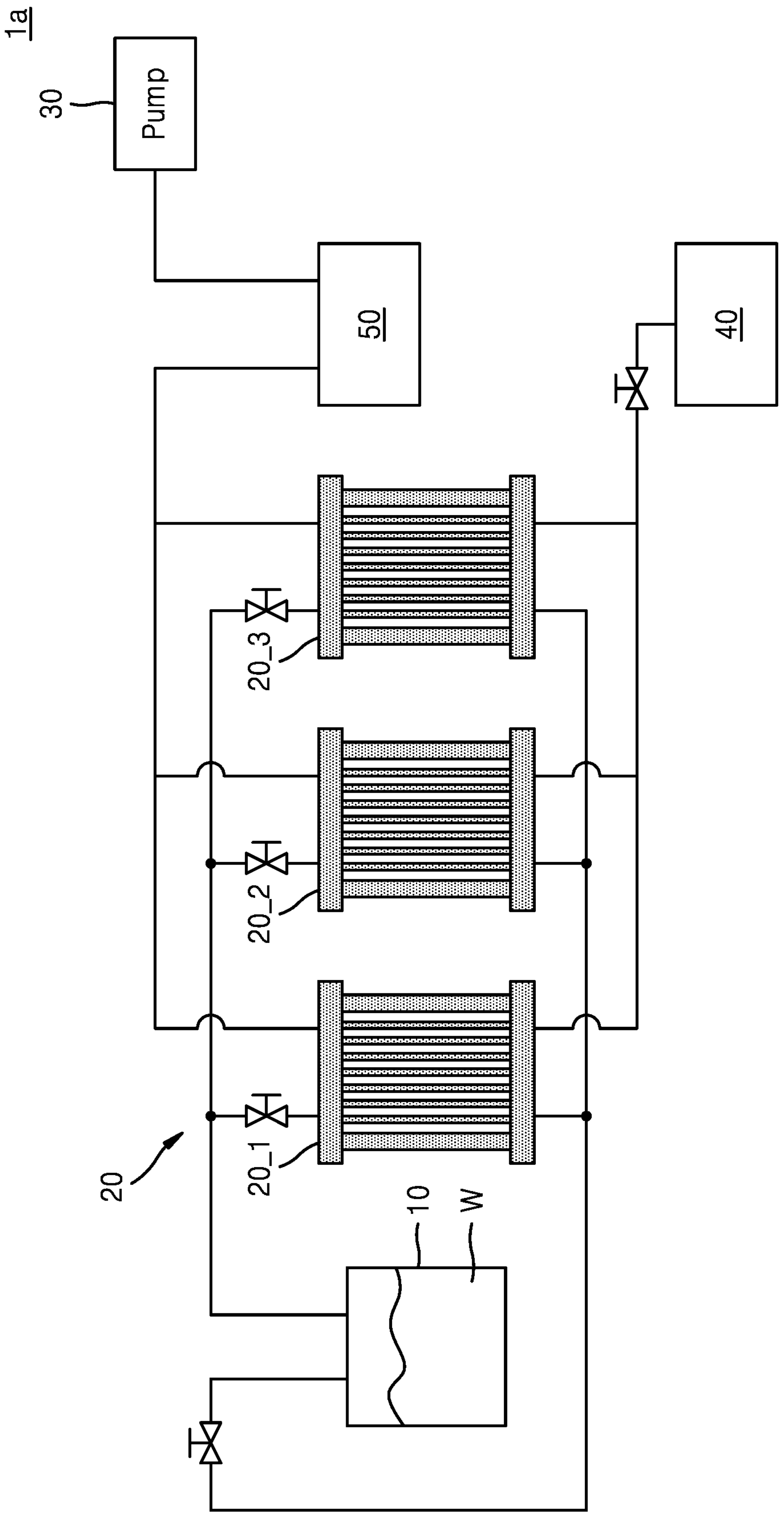
FIG. 9 is a schematic diagram illustrating an apparatus for treating wastewater according to embodiments.

FIG. 9 is a schematic diagram illustrating an apparatus for treating wastewater 1*a* according to embodiments.

Referring to FIG. 9, an apparatus for treating wastewater 1*a* may include a plurality of membrane units 20 connected in parallel to a water storage tank 10. For example, a first membrane unit 20_1, a second membrane unit 20_2, and a third membrane unit 20_3 may be connected in parallel to each other to receive wastewater W from the water storage tank 10, and vacuum may be simultaneously applied from the pump 40 to the first membrane unit 20_1, the second membrane unit 20_2, and the third membrane unit 20_3. As the plurality of membrane units 20 are installed in parallel, the wastewater treatment capacity may be increased.

Figure 10:
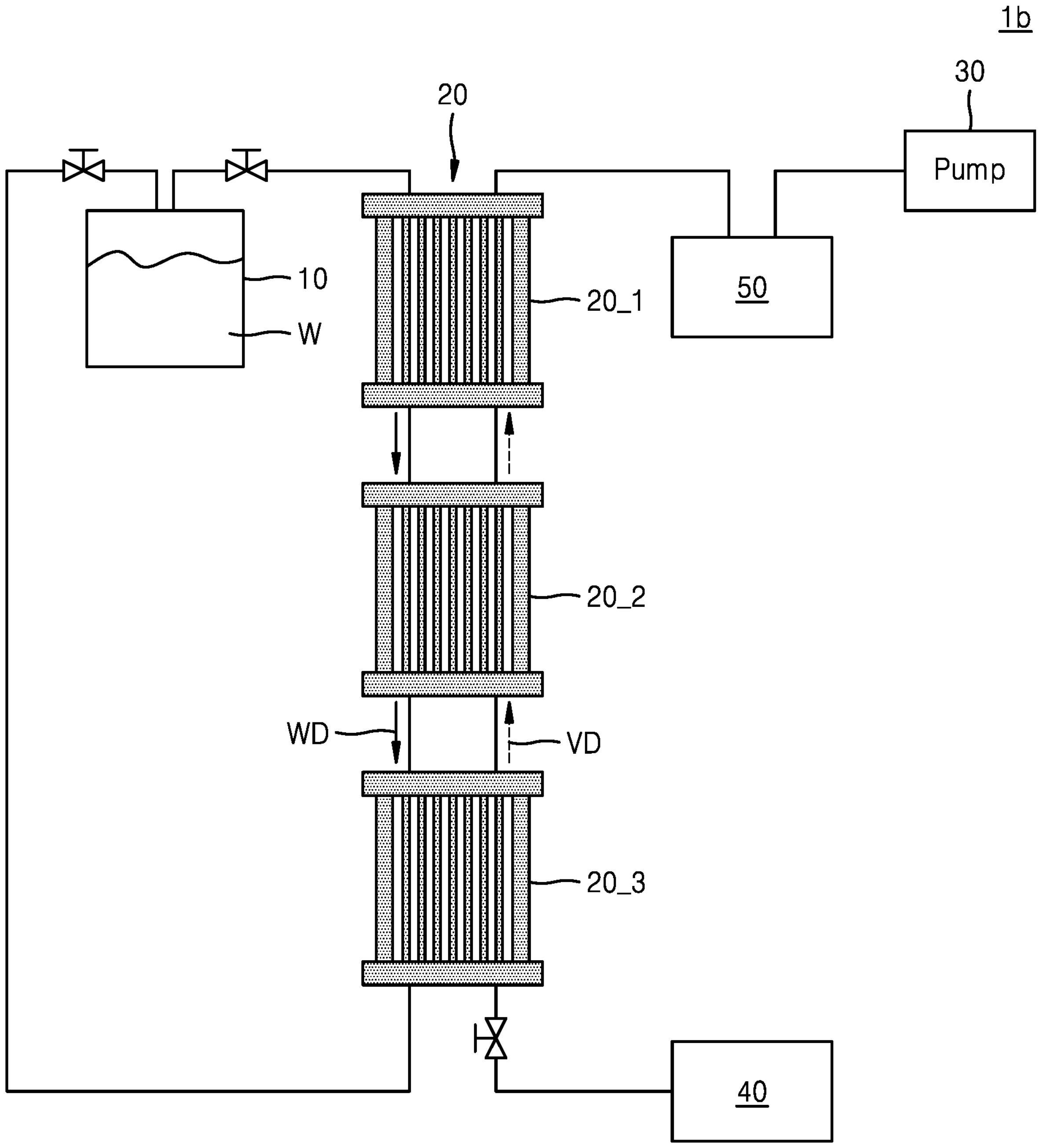
FIG. 10 is a schematic diagram illustrating an apparatus for treating wastewater according to embodiments.

FIG. 10 is a schematic diagram illustrating an apparatus for treating wastewater 1*b* according to embodiments.

Referring to FIG. 10, an apparatus for treating wastewater 1*b* may include a plurality of membrane units 20 serially connected to a water storage tank 10. For example, a first membrane unit 20_1, a second membrane unit 20_2, and a third membrane unit 20_3 are arranged to be connected in series. In FIG. 10, a wastewater movement direction WD is indicated by a solid arrow, and a gas movement direction VD is indicated by a dashed arrow.

As shown in FIG. 10, the first membrane unit 20_1 is disposed to receive wastewater W from the water storage tank 10, and the wastewater W passing through the first membrane unit 20_1 (for example, the wastewater W in which some amount of hydrofluoric acid in the exhausted state is removed by evaporation of hydrofluoric acid gas) may be supplied to the second membrane unit 20_2. The wastewater W passing through the second membrane unit 20_2 may be supplied to the third membrane unit 20_3. According to embodiments, as the plurality of membrane units 20 are installed in series, the removal efficiency of hydrofluoric acid gas (HF) from the wastewater W may be improved.

FIG. 11 is a table showing experimental results obtained by using a method for treating wastewater according to embodiments.

Referring to FIG. 11, the method for treating wastewater was carried out for a first process time of 20 hours using either a micro-membrane module or a medium-sized membrane module. It is confirmed that the wastewater before treatment contains 1050 ppm of fluorine ions, whereas the wastewater after treatment contains 500 to 670 ppm of fluorine ions, indicating a maximum 52% fluoride ion removal rate. It may be confirmed that hydrofluoric acid gas was effectively separated and recovered from wastewater by the method for treating wastewater.

While the inventive concept has been particularly shown and described with reference to embodiments thereof, it will be understood that various changes in form and details may be made therein without departing from the spirit and scope of the following claims.

What is claimed is:

1. A method for treating wastewater containing fluorine, the method comprising:

applying a vacuum to a membrane unit including a membrane having a hollow;

injecting wastewater containing fluorine into the membrane unit so that the wastewater containing fluorine contacts an outer surface of the membrane;

recovering hydrofluoric acid gas by evaporating hydrofluoric acid (HF) in the wastewater containing fluorine based on a vacuum applied to an inner surface of the membrane and moving the evaporated hydrofluoric acid (HF) to the inner surface through the membrane;

injecting sweep gas into the membrane unit to discharge the hydrofluoric acid gas remaining on the inner surface of the membrane; and forming a metal fluoride by reacting the recovered hydrofluoric acid gas with a metal oxide or metal hydroxide using a scrubbing process.

2. The method of claim 1, wherein the applying of a vacuum includes applying a vacuum such that the inside of the hollow of the membrane is maintained at a pressure of about 0.1 to about 100 Torr.

3. The method of claim 1, wherein the membrane includes at least one of tetrafluoroethylene hexafluoropropylene (FEP), perfluoroalkylvinyl-ether (PFA), ethylene-tetrafluoroethylene (ETFE), polyvinylidene fluoride (PVDF), polytetrafluoroethylene (PTFE), polyethylene (PE), polypropylene (PP), polyether ether ketone (PEEK), polyarylsulfone (PSU), polyethersulphone (PES), polyimide (PI), and polybenzimidazole (PBI), and wherein the membrane has a hydrophobic surface property.

4. The method of claim 1, wherein the sweep gas includes air or nitrogen, and the injecting of the sweep gas is performed for a period of about 1 second to about 10 minutes.

5. The method of claim 1, wherein the scrubbing process includes a wet scrubbing process or a dry scrubbing process.

6. The method of claim 1, wherein the metal oxide or metal hydroxide is calcium oxide, calcium hydroxide, aluminum oxide, aluminum hydroxide, magnesium oxide, or magnesium hydroxide.

7. The method of claim 1, wherein the metal fluoride has a purity based on mass that is greater than about 80%.

8. The method of claim 1, wherein the wastewater containing fluorine is stored in a water storage tank, the method further comprising:

adjusting the pH of the wastewater containing fluorine by injecting at least one of sulfuric acid and hydrochloric acid into the water storage tank.

9. The method of claim 8, wherein the pH in the water storage tank is maintained to be less than or equal to 2.

10. An apparatus for treating wastewater containing fluorine, the apparatus comprising:

a water storage tank configured to store wastewater containing fluorine;

a membrane unit including a membrane having a hollow and installed so that the wastewater containing fluorine, when supplied from the water storage tank, is in contact with an outer surface of the membrane;

a pump connected to the membrane unit and configured to apply a vacuum to an inner surface of the membrane such that hydrofluoric acid (HF) gas from the wastewater containing fluorine disposed within the membrane unit moves through the membrane onto the inner surface of the membrane; and a scrubbing unit connected to the membrane unit and configured to react hydrofluoric acid gas from the inner surface of the membrane with a metal oxide or a metal hydroxide to form a metal fluoride.

11. The apparatus of claim 10, wherein the pump is configured to draw a vacuum so that a pressure of about 0.1 to about 100 Torr is maintained inside the hollow of the membrane.

12. The apparatus of claim 10, wherein the membrane includes at least one of tetrafluoroethylene hexafluoropropylene (FEP), perfluoroalkylvinyl-ether (PFA), ethylene-tetrafluoroethylene (ETFE), polyvinylidene fluoride (PVDF), polytetrafluoroethylene (PTFE), polyethylene (PE), polypropylene (PP), polyether ether ketone (PEEK), polyarylsulfone (PSU), polyethersulphone (PES), polyimide (PI), and polybenzimidazole (PBI), and wherein the membrane has a hydrophobic surface property.

13. The apparatus of claim 10, further comprising a sweep gas supply unit connected to the membrane unit and configured to inject sweep gas into the hollow of the membrane, and the sweep gas includes air or nitrogen.

14. The apparatus of claim 10, wherein the scrubbing unit comprises:

a scrubbing chamber;

a liquid supply unit configured to inject an aqueous solution of the metal oxide or an aqueous solution of the metal hydroxide into the scrubbing chamber; and a gas supply unit configured to inject hydrofluoric acid gas into the scrubbing chamber.

15. The apparatus of claim 10, wherein the metal fluoride includes calcium fluoride, aluminum fluoride, or magnesium fluoride, and wherein the metal fluoride has a purity based on mass that is greater than about 80%.

16. The apparatus of claim 10, wherein the membrane unit comprises one of: a plurality of membrane units connected in series, or a plurality of membrane units connected in parallel.

17. An apparatus for treating wastewater containing fluorine, the apparatus comprising:

a water storage tank configured to store wastewater containing fluorine;

a membrane unit including a membrane having a hollow and installed so that the wastewater containing fluorine, when supplied from the water storage tank, is in contact with an outer surface of the membrane;

a pump connected to the membrane unit and configured to apply a vacuum to an inner surface of the membrane such that hydrofluoric acid (HF) gas from the wastewater containing fluorine disposed within the membrane unit moves through the membrane onto the inner surface of the membrane;

a sweep gas supply unit connected to the membrane unit and configured to inject sweep gas into the hollow of the membrane; and a scrubbing unit connected to the membrane unit and configured to react hydrofluoric acid gas from the inner surface of the membrane with a metal oxide or a metal hydroxide to form a metal fluoride.

18. The apparatus of claim 17, wherein the scrubbing unit comprises;

a scrubbing chamber;

a liquid supply unit configured to inject an aqueous solution of the metal oxide or an aqueous solution of the metal hydroxide into the scrubbing chamber; and a gas supply unit configured to inject hydrofluoric acid gas into the scrubbing chamber.

19. The apparatus of claim 17, wherein the scrubbing unit is configured to react hydrofluoric acid gas with the metal hydroxide, and comprises a scrubbing chamber configured to accommodate metal hydroxide pellets; and a gas supply unit configured to inject hydrofluoric acid gas into the scrubbing chamber.

20. The apparatus of claim 17, wherein the pump is configured to draw a vacuum so that a pressure of about 0.1 to about 100 Torr is maintained inside the hollow of the membrane.

* * * * *